(12) United States Patent
LaRocco

(10) Patent No.: US 10,875,476 B2
(45) Date of Patent: Dec. 29, 2020

(54) REEFER TRAILER WITH ROOF AND SUBPAN HEAT REFLECTIVE FILM AND METHOD

(71) Applicant: Michael C. LaRocco, Sewickley, PA (US)

(72) Inventor: Michael C. LaRocco, Sewickley, PA (US)

( * ) Notice: Subject to any disclaimer, the term of this patent is extended or adjusted under 35 U.S.C. 154(b) by 21 days.

(21) Appl. No.: 16/297,541

(22) Filed: Mar. 8, 2019

(65) Prior Publication Data

US 2019/0275963 A1 Sep. 12, 2019

Related U.S. Application Data

(60) Provisional application No. 62/640,124, filed on Mar. 8, 2018.

(51) Int. Cl.
| | |
|---|---|
| *B60P 3/20* | (2006.01) |
| *B62D 53/06* | (2006.01) |
| *B60R 13/08* | (2006.01) |
| *B62D 29/00* | (2006.01) |
| *B32B 7/027* | (2019.01) |
| *B32B 27/06* | (2006.01) |
| *B32B 27/12* | (2006.01) |
| *B32B 27/40* | (2006.01) |
| *B32B 27/36* | (2006.01) |
| *B32B 27/32* | (2006.01) |
| *B32B 15/09* | (2006.01) |
| *B32B 15/14* | (2006.01) |
| *B32B 15/20* | (2006.01) |

(52) U.S. Cl.
CPC ............ *B60R 13/0861* (2013.01); *B60P 3/20* (2013.01); *B62D 29/002* (2013.01); *B62D 53/06* (2013.01); *B32B 7/027* (2019.01); *B32B 15/09* (2013.01); *B32B 15/14* (2013.01); *B32B 15/20* (2013.01); *B32B 27/065* (2013.01); *B32B 27/12* (2013.01); *B32B 27/32* (2013.01); *B32B 27/36* (2013.01); *B32B 27/40* (2013.01); *B32B 2262/0284* (2013.01); *B32B 2262/101* (2013.01); *B32B 2266/0278* (2013.01); *B32B 2307/304* (2013.01); *B32B 2307/412* (2013.01); *B32B 2605/08* (2013.01)

(58) Field of Classification Search
CPC ......... B60P 3/20; B62D 53/06; B62D 33/048; B62D 29/002; B62D 25/10; B62D 25/06; B62D 25/2054
USPC .......... 296/24.35, 181.6, 184.1, 185.1, 186.1
See application file for complete search history.

(56) References Cited

U.S. PATENT DOCUMENTS

| | | | |
|---|---|---|---|
| 7,025,408 B2 * | 4/2006 | Jones | B32B 27/06 296/186.1 |
| 7,901,537 B2 * | 3/2011 | Jones | B32B 27/00 156/289 |
| 9,051,014 B2 * | 6/2015 | Lookebill | B62D 33/048 |
| 10,029,743 B2 * | 7/2018 | Schlumm | B60P 3/20 |
| 10,046,811 B2 * | 8/2018 | Schlumm | B32B 27/36 |

* cited by examiner

*Primary Examiner* — Dennis H Pedder
(74) *Attorney, Agent, or Firm* — Gary P. Topolosky

(57) ABSTRACT

A thermal radiation shield for the floors and roofs of trailer reefer units. The shield includes a low-emissivity, heat reflecting film that includes a metal coating layer, preferably vapor deposited, further protected by a layer of durable PET film.

5 Claims, 4 Drawing Sheets

CURRENT SYSTEM:
THERMAL RADIATION FROM ROADWAY PENETRATES TO HEAT TRAILER FLOOR.

(REEFER FLOOR CROSS-SECTION)

NEW LOW-E HEAT REFECTING FILM:
ROADWAY THERMAL RADIATION REFLECTED AWAY FROM TRAILER.

THERMAL HEAT REFLECTION LAYER (LOW-EMISSIVITY COATING UNDER DURABLE PET FILM)

REFLECTED HEAT

REEFER TRAILER WITH ROOF AND SUBPAN HEAT REFLECTIVE FILM AND METHOD

CROSS REFERENCE TO RELATED APPLICATION

This application is a perfection of U.S. Provisional Application Ser. No. 62/640,124, filed on Mar. 8, 2018, the disclosure of which is fully incorporated by reference herein.

BACKGROUND OF THE INVENTION

1. Field of the Invention

This invention relates to refrigerated transport trailers railcars, shipping containers, box trucks, and general refrigeration vehicles, hereinafter collectively "reefer units". More particularly, it relates to structural improvements to the sub-floors and roofs of such reefer units to improve their high temperature thermal resistance and/or interior temperature control either while on the road or when stopped for any length of time.

It is well known the extent to which trailers on the road experience increasingly extreme high temperatures radiating upward from a hot asphalt road and/or parking surface. Much of this heat (as infrared heat) transfers upwardly to the underside of refrigerated trailers where such heat negatively impacts the cooling temperatures inside and requires additional cooling procedures to compensate for these radiated heat "losses". With the current systems (before this invention), thermal radiation from the roadways and parking surfaces penetrate to heat trailer floor as best seen in accompanying FIG. 2B. This invention proposes to solve that "problem" with the addition of a new low-emissivity (or "Low-E") heat reflecting film for reflecting roadway thermal radiation away from the trailer and its contents. One preferred version entails adding to an existing trailer, or when building one anew, including a thermal heat reflection layer with a Low-E coating under a durable PET film to the trailer underside. Additionally, a variation of this same heat reflective material may be incorporated into the roof areas for further trailer heat performance improvements.

2. Relevant Art

Numerous references address various aspects of reefer units and/or other trailer transportation devices. They include, but are not limited to, U.S. Pat. Nos. 9,694,897 and 5,170,605 along with U.S. Published Application Nos. 20140147642, 2014144161 and 20140127451. There is also relevant, but distinguishable teachings in WO19990140372, RU114073, JP2010076799, CN101415599 and DE102013102039.

None of the foregoing teach or suggest any changes to an existing reefer unit sub-floor or ceiling, or to a newly constructed floor or ceiling for the same, for imparting significant heat reflectivity to the undercarriage of such units (from the direction of the ground/highway, or floor in general), OR from the direction of the uppermost ceiling (or roof) to such units.

It is well known, and documented, the extent to which increasingly extreme high temperatures affect the thermal efficiencies of reefer units. With hot highway/asphalt roads and/or parking surfaces (for rest stops and loading/unloading areas), these surfaces naturally reflect and then radiate massive amounts of heat to the undersides of such units. Similarly, significant amounts of open highway driving will expose the upper roofs to these same units to continuous "baking" from the sun. What is desired is a means for creating a radiant barrier layer insulating these two regions of a reefer unit to such high heat exposures. Ideally, this invention may provide significant heat reductions to the sub-floor and/or ceiling of reefer units either through their use as a substitute for various sub-floor and/or roof components in a new construction OR as an after market, "add on" layering) or as a supplemental addition to the sub-floor and/or ceiling-roof of a new or existing reefer unit.

SUMMARY OF THE INVENTION

This invention offers a thermal radiation subpan shield for reefer units (as defined above). It provides a new Low-E, heat reflecting film (or coated film product) that will be cooler, lighter yet stronger than the current sub-flooring (and roof construction) that it replaces. It will have NO pinholes there through. With such a glass-reinforced layer, this invention will provide: (a) composite durability; (b) proven corrosion resistance AND (c) a heat reflective layer contained within a composite film.

This invention will offer a weight savings of over 6 pounds for a typical 53 foot reefer trailer with improved aesthetics and consistency. Preliminary laboratory heat gain testing has also been observed.

One version uses a glass-reinforced bi-directional thermoplastic panel that provides composite durability, naturally proven corrosion resistance yet with a reflective layer contained with (or incorporated in) a composite layer therefor.

Another variation employs a polyester PET surface film as a replacement for PP film in a reefer trailer's floor construction. PET is a higher temperature film that will not melt in lamination. PET is 100% closed as a film with NO pinholes. It is also a harder surface, more scratch resistant than its PP counterpart.

Ideally, this invention, as a composite nonwoven, includes a vapor deposited aluminum coating to give the opacity and heat reflecting capability that traps the metallized layer beneath this PET surface layer. The surface itself will be film bonded with a composite fiber, non-woven backing.

BRIEF SUMMARY OF THE FIGURES

Further features, objectives and advantages of this invention will be made clearer with the following Detailed Description of Preferred Embodiments made with reference to the accompanying Figures in which.

DESCRIPTION OF PREFERRED EMBODIMENTS

This invention will replace standard sub-flooring AND roofing materials with a vapor deposited, aluminum coating onto a composite non-woven under a PET surface to give the opacity and heat reflecting capability. The coating is only a few angstroms thick, so the weight of it can't even be measured. The metallization behind PET backing that will reduce the amount of reflective heat from the highway passing through that floor and into the reefer unit proper from below; as well as reducing the amount of heat radiating downward from the sun, into and through the roofs of existing reefer trailer units.

Further advantages of this invention include measurably reducing thermal radiation from below for a PET film incorporated into the trailer's flooring layers and from above when adding pinhole-free PET films into the roofs of such trailers.

Particular preferred product details include:

Providing a coated film product that is not significantly electrically conductive, so it would not be a potential source for galvanic corrosion.

The coating itself product would be fully insulated from exposure to surface air and contact parts by a film layer. If that film rubs off, the reflective coating would still be non-conductive.

One representative embodiment of this invention would be an aluminum coating about 50-200 Angstroms thick, more preferably about 100 Angstroms (or 0.00000001 m) thick. If the film fully or partially wears off for any reason, the coating will go with it.

A plastic film applied over this thermal reflective layer would be about 10,000 times thicker than the coating alone.

The backing fibers would include a fiber diameter of $30 \times 10^6$

Figure 1A:
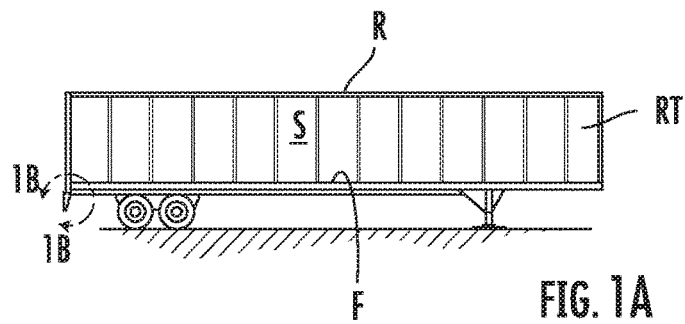
FIG. 1A is a right side view of a typical reefer trailer RT with its roof R, sidewall S and trailer floor F.
Figure 1B:
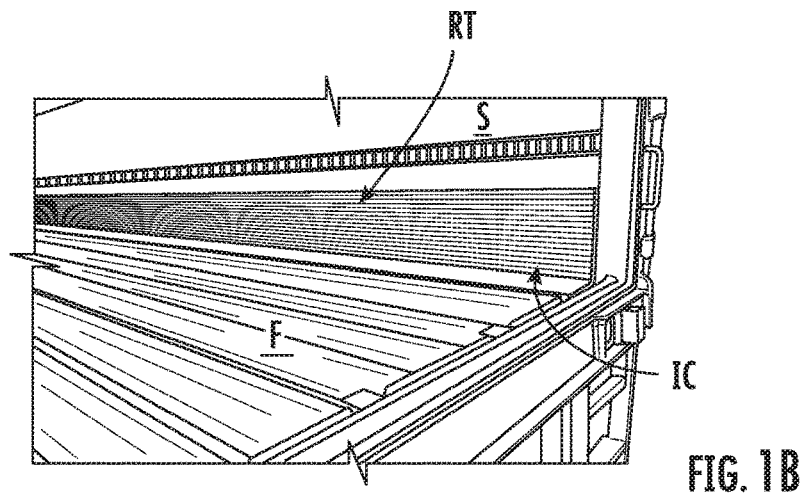
FIG. 1B is a perspective close up view of the circled area IB in FIG. 1A showing an inside corner IC where the sidewall S for typical reefer trailer RT meets the floor F.
Figure 1C:
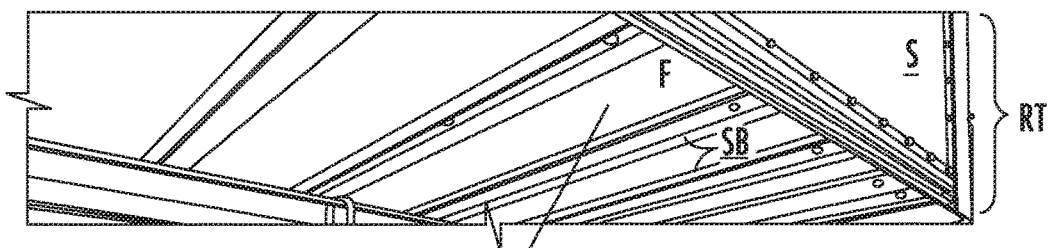
FIG. 1C is an underside perspective view of the floor F to the typical reefer trailer RT of FIGS. 1A and B with its plurality of cross support beams SB.
Figure 2A:
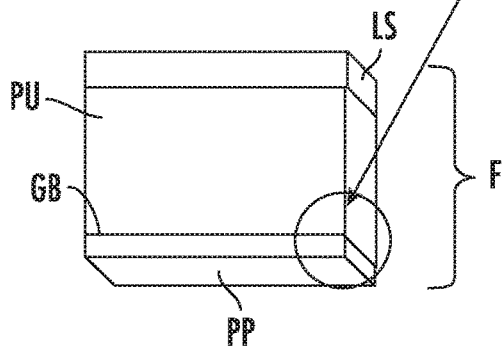
FIG. 2A is a cross-sectional view showing an exploded segment of typical trailer floor F (i.e., a prior art reefer subpan) with its loading surface LS beneath which is located an insulation layer of polyurethane foam PU, a glass reinforced base GB and a lowermost polypropylene film surface PP.
Figure 2B:
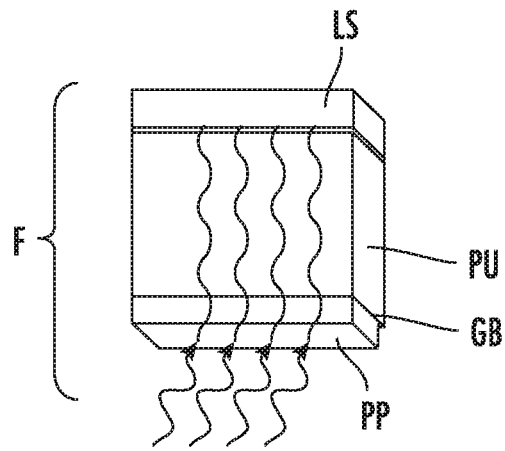
FIG. 2B is a side schematic view of the typical prior art reefer floor from FIG. 2A with arrows depicting how thermal radiation from the roadway and/or parking surface beneath floor F penetrates that floor and enters the trailer interior through loading surface LS.
Figure 3:
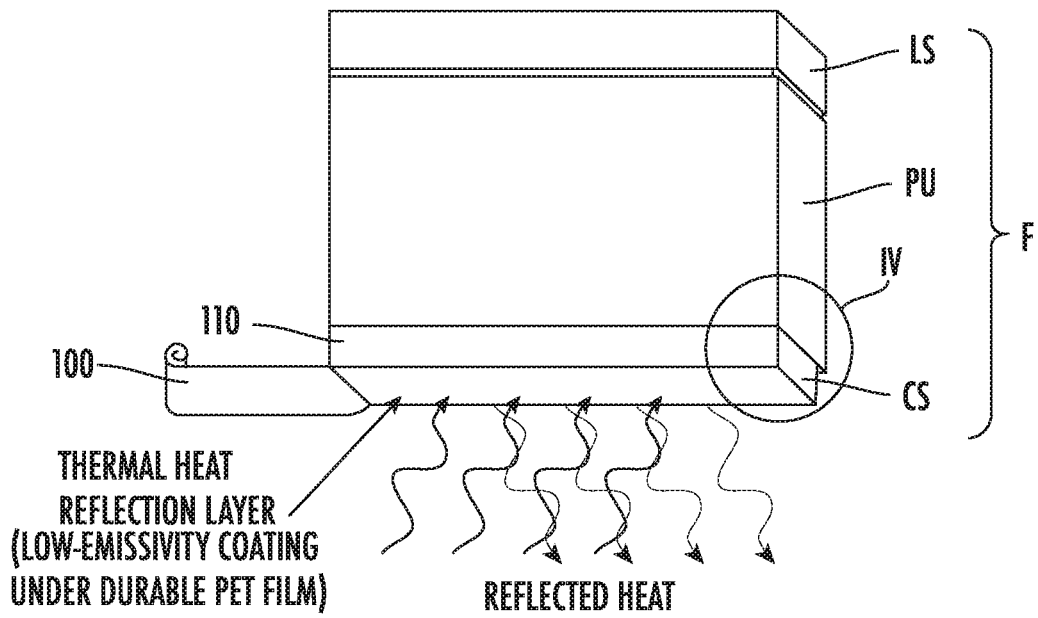
FIG. 3 is a side schematic view showing one embodiment of this invention with a new composite GRP subpan CS consisting of a thermal heat reflection coating layer 100 under a durable PET film 110. Note how the arrows beneath this invention reflect the heat back down and away from the trailer interior.
Figure 4:
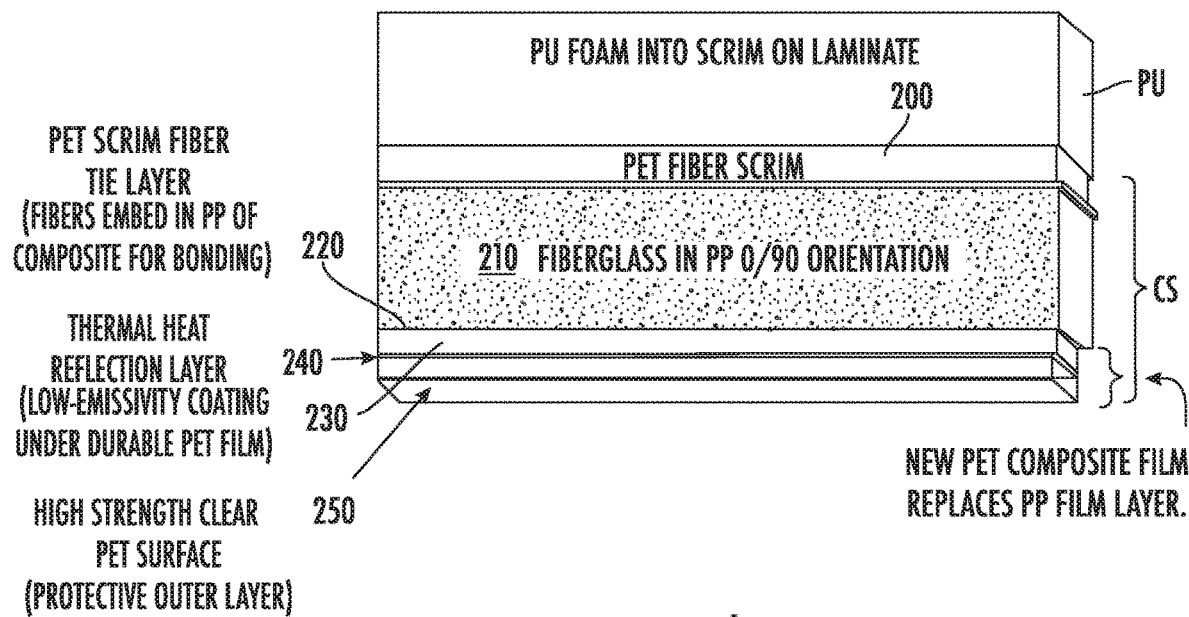
FIG. 4 is a close up, segmented view of the circled area IV in the lower right corner of FIG. 3 in which the various sub-layers to one embodiment are separately identified, namely: an uppermost polyurethane foam layer PU (into scrim on laminate) beneath which this invention adds a composite subpan CS consisting of a PET fiber scrim 200 atop a layer of fiberglass in polypropylene 210, preferably in a 0/90 orientation. Beneath that would be a PET scrim fiber tie layer 220 having fibers embedded in the polypropylene of a composite for better bonding. Beneath PET scrim tie layer 220 would be a durable PET film layer 230 having a low emissivity coating/reflection layer 240 followed up by an underside of high strength, preferably clear PET serving as the bottom most protective outer layer 250.
Figure 5B:
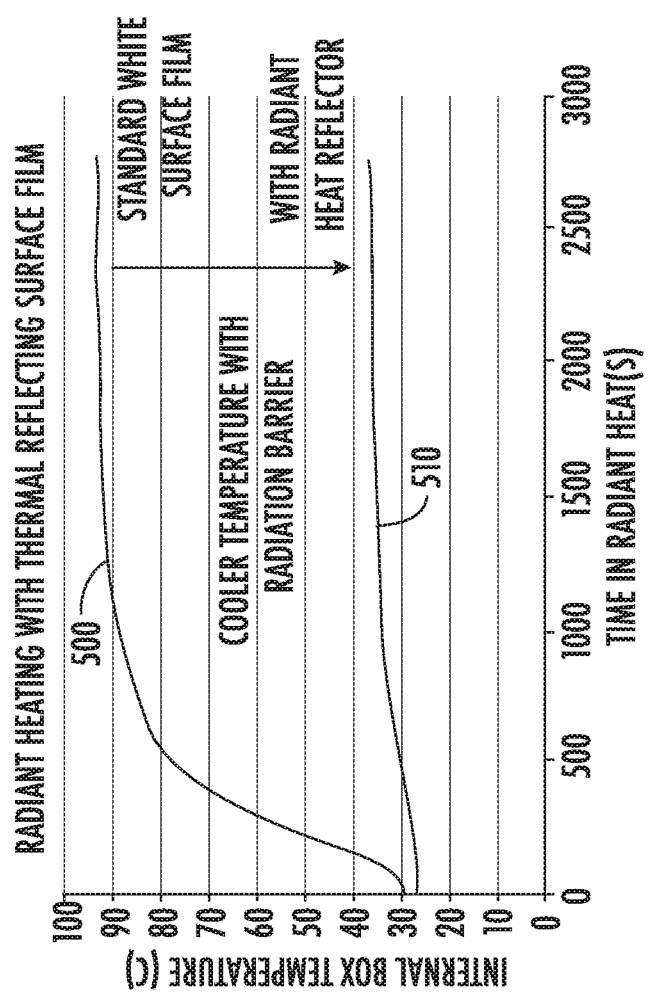
FIG. 5B is a graph depicting the expected heat saving improvements possible with the present invention when comparing temperatures for that lab test setup box IB over time for: just a standard white surface film (upper curve 500 of FIG. 5B); versus one with a radiant heat reflector incorporated therein (lower curve 510)
Figure 5A:
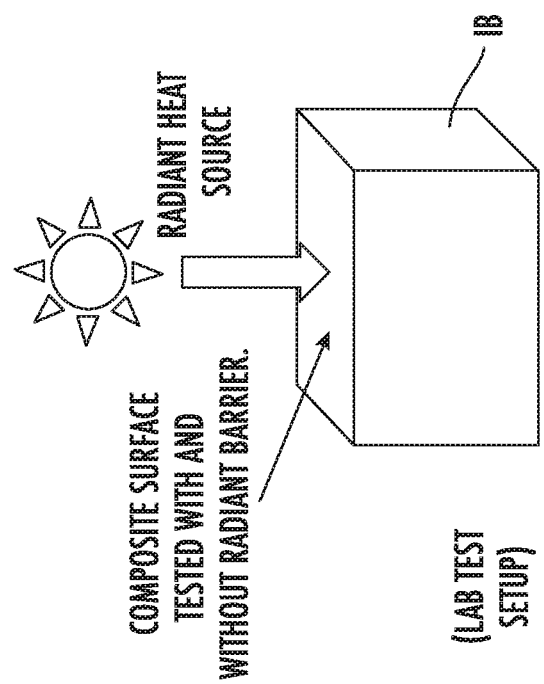
FIG. 5A is a diagrammatic representation of a simulated laboratory set up for showing an insulated box IB without a radiant roof barrier layer as would be heated from above by the sun.

One single fiber would be about 3000 times larger than the coating alone 0.0000027 grams/square meter (gsm) of reflective coating on 50 gsm composite film Referring now to FIGS. 3 and 4, there is seen one embodiment of improved trailer floor construction or system per this invention. Generally speaking, it consists of a new composite GRP subpan CS with a thermal heat reflection coating layer 100 under a durable PET film 110.

FIG. 4 shows the sublayers making up this improvement in more detail. They consist essentially of: an uppermost polyurethane foam layer PU (into scrim on laminate) beneath which this invention adds a composite subpan CS consisting of a PET fiber scrim 200 atop a layer of fiberglass in polypropylene 210, preferably in a 0/90 orientation. Beneath that would be a PET scrim fiber tie layer 220 having fibers embedded in the polypropylene of a composite for better bonding. Beneath PET scrim tie layer 220 would be a durable PET film layer 230 having a low emissivity coating/reflection layer 240 followed up by an underside of high strength, preferably clear PET serving as the bottom most protective outer layer 250.

For the new polyester (preferably PET) Surface Film that replaces a PP Film, it should be noted that:

PET is higher temperature film. It will not melt in lamination.

PET is 100% closed film, i.e, it will have NO pinholes.

PET is a harder surface for better resisting scratches.

The thin, metallized heat-reflecting layer will be purposefully trapped beneath the aforementioned PET surface layer; and The system includes a surface film bonded with composite fiber backing.

Having described the presently preferred embodiments, it is to be understood that this invention may otherwise be covered by the scope of the provisionally filed claims that follow.

What is claimed is:

1. A reefer trailer subpan having the following layers: (a) a polyurethane foam into scrim or laminate; (b) a PET fiber scrim; (c) a fiberglass in polypropylene layer; (d) a vapor deposited, metal coating for heat reflection; and (e) a layer of durable PET film applied over the metal coating.

2. The trailer subpan of claim 1, which further includes: (f) a clear high-strength, PET outer surface layer.

3. The trailer subpan of claim 1 wherein the fiberglass in polypropylene layer, element (c) above, has a 0/90 fiber orientation.

4. The trailer subpan of claim 1 wherein the vapor deposited, metal coating consists of aluminum, or an aluminum-based alloy.

5. The trailer subpan of claim 4 wherein the vapor deposited, metal coating layer is about 100 angstroms thick.

* * * * *